(12) United States Patent
Huang (10) Patent No.: US 8,972,678 B2
(45) Date of Patent: Mar. 3, 2015

(54) EFFICIENT BACKUP REPLICATION (75) Inventor: Mark Huang, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 372 days.

(21) Appl. No.: 13/332,474

(22) Filed: Dec. 21, 2011

(65) Prior Publication Data

US 2013/0166862 A1  Jun. 27, 2013

(51) Int. Cl.
*G06F 12/16* (2006.01)
(52) U.S. Cl.
USPC ........................................................ 711/162
(58) Field of Classification Search
None
See application file for complete search history.

(56) References Cited

U.S. PATENT DOCUMENTS

| 2004/0098547 | A1 | 5/2004 | Ofek et al. |
| 2005/0085222 | A1* | 4/2005 | Przybilski et al. ............ 455/418 |
| 2005/0216669 | A1* | 9/2005 | Zhu et al. ...................... 711/118 |
| 2008/0183901 | A1* | 7/2008 | Cardona et al. ............... 709/250 |
| 2008/0208933 | A1 | 8/2008 | Lyon |
| 2008/0294660 | A1* | 11/2008 | Patterson et al. ............. 707/100 |
| 2011/0167221 | A1 | 7/2011 | Pangal et al. |

* cited by examiner

*Primary Examiner* — Duc Doan
(74) *Attorney, Agent, or Firm* — Van Pelt, Yi & James LLP (57) ABSTRACT

A system for backup replication comprises a processor and a memory. The processor is configured to determine data present in a most recent backup not present in a previous backup; transmit an extent specification; and transmit data segment fingerprints of the one or more data segments. The memory is coupled to the processor and is configured to provide the processor with instructions.

14 Claims, 5 Drawing Sheets

EFFICIENT BACKUP REPLICATION

BACKGROUND OF THE INVENTION

Some computing systems backup data in multiple locations in order to increase the safety of the data. Backing up data in multiple locations can be accomplished through the use of a primary backup system and a replica backup system. Each time a backup is performed, the state of the computing system is determined, and all information in the current state is recorded into a backup in the primary backup system. After the backup in the primary backup system is created, it is replicated, e.g., copied to the replica backup system. Some backup storage systems store both incremental backups, comprising only the changes in state since the previous backup, and full backups, comprising the complete state of the storage system at the time it was made. Some backup storage systems store only full backups.

Some data storage systems compress data using deduplication, e.g., by breaking data into chunks and only storing each chunk once regardless of how many times it occurs in the original data. Replicating data in a deduplicating storage system can be accomplished by transmitting identifying information for each chunk from the primary backup system to the replica backup system, using the identifying information to determine which chunks are stored on the replica, and transmitting data chunks determined to not already be stored on the replica. If the chunk is already stored it does not need to be copied to the replica a second time.

Since a full backup captures the complete state of a computing system, it is typically a very large file, and replicating a full backup requires a great deal of information to be transmitted from the primary backup to the replica backup. In a deduplicating system, although more efficient than transmitting an entire full backup, even just transmitting the identifying information for each data chunk of a full backup can incur substantial overhead and require too much time and bandwidth.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Backup replication is disclosed. A system for backup replication comprises a processor and a memory. The processor is configured to determine data present in a most recent backup not present in a previous backup; transmit an extent specification; and transmit data segment fingerprints of the one or more data segments. The memory is coupled to the processor and is configured to provide the processor with instructions.

Efficient backup replication is disclosed. A system comprises a processor and a memory. The processor is configured to determine data present in a most recent backup that is not present in a previous backup. The processor is further configured to segment the data. The processor is further configured to transmit data segment identifying information. The memory is coupled to the processor and configured to provide the processor with instructions. In some embodiments, the primary system further transmits information enabling the reconstruction of the new backup file using the extent information and list of new segments transmitted to the replica system.

In some embodiments, when replicating a full backup in a deduplicating storage system, efficiency can be improved by taking advantage of the knowledge that the file being replicated is a backup file, and is likely very similar to a previous backup file. The deduplicating system is given information indicating the most recent backup file that has been transmitted to the replica system. Rather than breaking the entire new backup file into segments and sending segment identifying information for each backup file segment from the primary system to the replica system, the deduplicating system calculates the differential between the new backup file and the most recent file previously replicated, and only replicates information not found in the most recent file, along with information describing the portion of the file that is unchanged.

In some embodiments, data comprising the differential between the new backup file to be replicated and the most recent file previously replicated (e.g., difference data) is segmented, and segment identifying information is transmitted from the primary system to the replica system. If one or more of the data segments is determined to be not present on the replica system, a data segment request is then transmitted to the primary system by the replica system. Each data segment not present on the replica system is then transmitted from the primary system to the replica system. The primary system additionally transmits extent specifications, comprising descriptions of regions of the most recent file previously replicated that are unchanged in the backup file being replicated. In some embodiments, the primary system additionally transmits difference data locations. In some embodiments, the primary system further transmits information enabling the reconstruction of the new backup file using the extent information and list of new segments transmitted to the replica system.

In some embodiments, upon receiving segment identifying information, any segments not already present, and any appropriate extent specifications, the replica system is able to recreate the backup file. A new backup file is created on the replica system, and data stored in regions described by the extent specifications is re-referenced or copied from the previously replicated backup file to the new backup file. Data not present in the previously copied backup file is filled in by data segments from other files on the replica system as indicated by segment identifying information and meta information (e.g., ordering information used for reconstructing the new backup file using the new segments), or by data segments not found on the replica system and transmitted by the primary system. In some embodiments, the primary system transmits a checksum to the replica system, to ensure the newly created backup file on the replica system is identical to the new backup file on the primary system.

Figure 1:
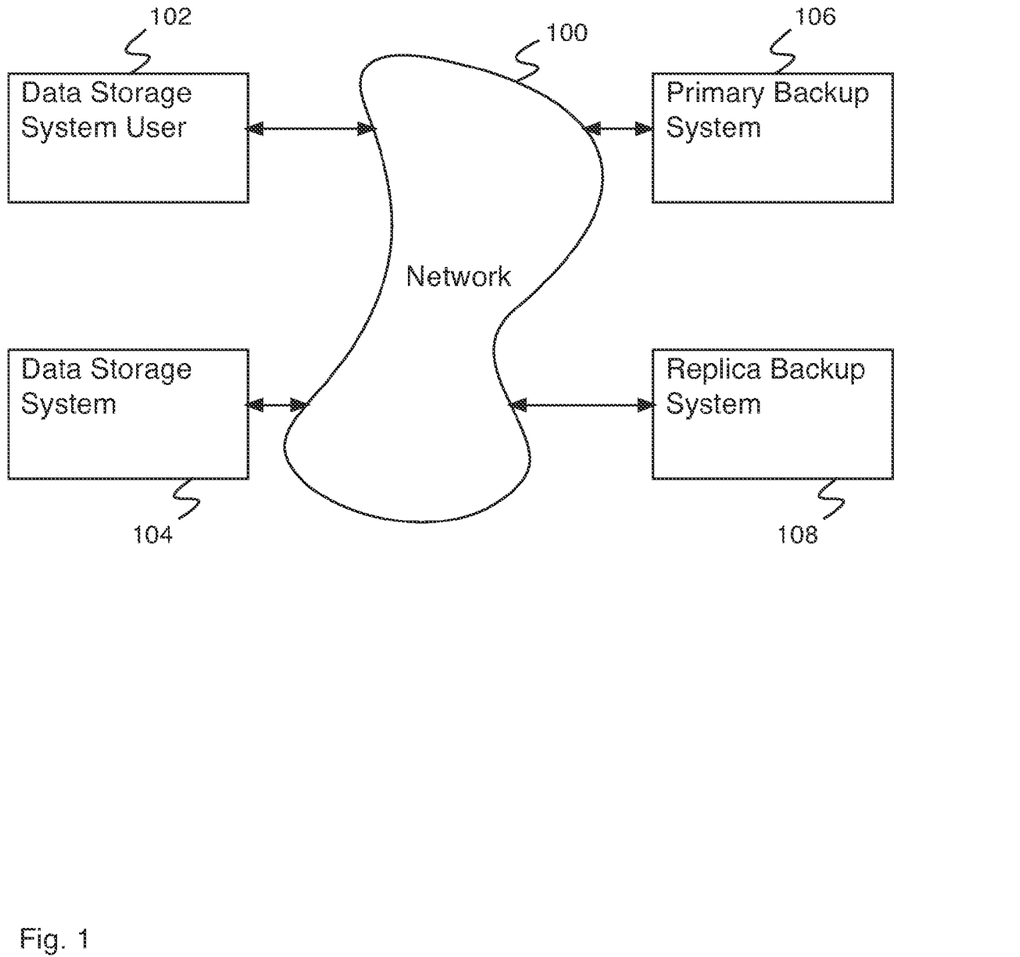
FIG. 1 is a block diagram illustrating an embodiment of a network system.

FIG. 1 is a block diagram illustrating an embodiment of a network system. In the example shown, the network system comprises data storage system user 102, data storage system 104, primary backup system 106, and replica backup system 108 communicating via network 100. In various embodiments, network 100 comprises one or more of the following: a local area network, a wide area network, a wired network, a wireless network, the Internet, or any other appropriate network.

Data storage system user 102 comprises a data storage system user accessing data storage services on data storage system 104. In some embodiments, data storage system 102 comprises a user who uses a user interface (e.g., a keyboard, a touch screen, a display, etc.) to interact with data storage system 102. In various embodiments, the user interface is associated with a desk top computer, a laptop computer, a local terminal, or any other appropriate system with a user interface. In some embodiments, data storage system user 102 comprises an employee at a company utilizing a data storage system. In some embodiments, data storage user 102 comprises an employee at a company purchasing data storage system services. In various embodiments, there are 1, 2, 4, 13, 22, 115, or any other appropriate number of database system users accessing data storage services on data storage system 104. In some embodiments, each data storage system user only has access to their own data stored on data storage system 104 and is able to utilize data storage system 104 as though they are the sole data storage system user.

Data storage system 104 comprises a data storage system for storage and retrieval of information. In some embodiments, data storage system 104 comprises a distributed data storage system, e.g., a data storage system comprising multiple computers not necessarily in the same location. In some embodiments, data storage system 104 comprises a system for processing information. In some embodiments, data storage system 104 comprises a storage system optimized to efficiently store uncompressed files. In some embodiments, data storage system 104 comprises a deduplicating storage system. Primary backup system 106 comprises a backup system for backing up data storage system 104. In some embodiments, primary backup system 106 comprises a system for storing the state of data storage system 104 at various points in time. In some embodiments, primary backup system 106 stores the state of data storage system 104 at regular intervals. In various embodiments, regular intervals comprise every hour, every day, three times a week, once a week, once a month, or any other appropriate interval. In some embodiments, each time primary backup system 106 stores the state of data storage system 104, it creates a full backup (e.g., a complete copy of the data stored in data storage system 104). In some embodiments, primary backup system 106 creates some full backups and some incremental backups (e.g., copies of the changes made to data storage system 104 since the last backup made). In some embodiments, primary backup system 106 comprises a deduplicating storage system. Replica backup system 108 comprises a replica backup system for storing a replica of primary backup system 106. In some embodiments, each time a backup file (e.g., a full backup or an incremental backup) is made on primary backup system 106, it is copied to replica backup system 108. In some embodiments, primary backup system 106 and replica backup system 108 are contained in separate computers in order to protect backup data in the event of system failure. In some embodiments, primary backup system 106 and replica backup system 108 are located physically remotely from one another in order to protect data in the event of a location specific event (e.g., loss of power, loss of network connectivity, natural disaster, etc.).

Figure 2:
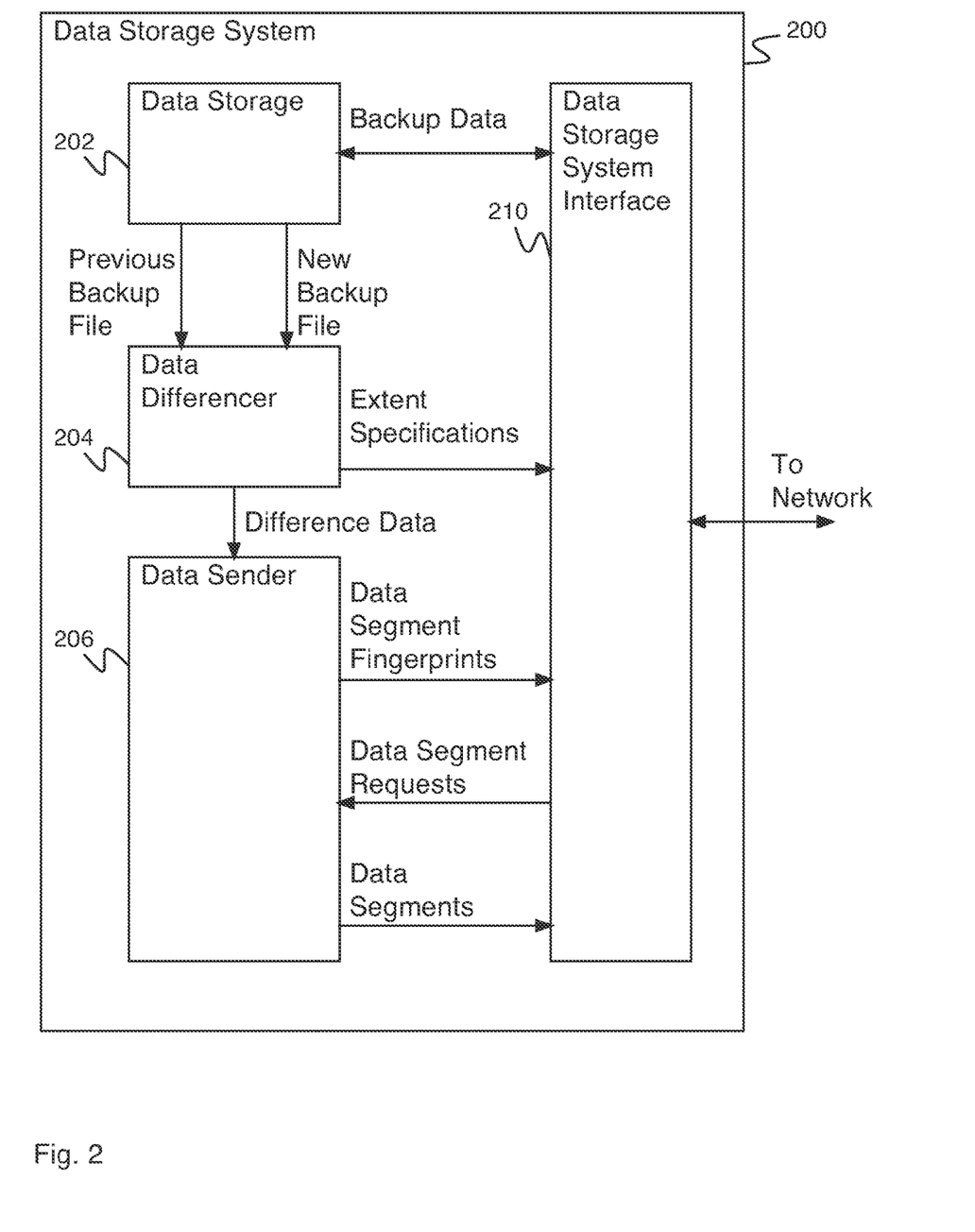
FIG. 2 is a block diagram illustrating an embodiment of a data storage system.

FIG. 2 is a block diagram illustrating an embodiment of a data storage system. In some embodiments, data storage system 200 of FIG. 2 comprises primary backup system 106 of FIG. 1. In some embodiments, data storage system 200 of FIG. 2 comprises a system for efficient backup replication.

In the example shown, data storage system 200 comprises data storage 202, data differencer 204, data sender 206, and data storage system interface 210. In some embodiments, data storage system interface 210 comprises an interface for communicating with a network (e.g., network 100 of FIG. 1). Data storage 202 comprises stored files. In some embodiments, data storage 202 comprises stored backup files. In some embodiments, data storage 202 comprises stored backups of a data storage system (e.g., data storage system 104 of FIG. 1). In some embodiments, data storage 202 comprises some full backups and some incremental backups. In some embodiments, data storage 202 comprises entirely full backups. Data storage 202 communicates with a network (e.g., network 100 of FIG. 1) via data storage system interface for receiving and delivering backup data.

In the example shown, data storage 202 delivers a new backup file and a previous backup file to data differencer 204, as part of a process for efficient backup replication. In some embodiments, the new backup file is to be replicated (e.g., copied to a replica backup system as in replica backup system 108 of FIG. 1). In some embodiments, the new backup file comprises a full backup. In some embodiments, the previous backup file comprises a full backup. In some embodiments, the previous backup file comprises a synthetic full backup (e.g., a full backup created from an older full backup and more recent incremental backups). In some embodiments, the previous backup file is the most recent previous backup file. In some embodiments, the previous backup file is an older backup file. Data differencer 204 receives the previous backup file and the new backup file and determines extent specifications and difference data. Extent specifications comprise descriptions of regions of unchanged data (e.g., regions where data present in the new backup file is also present in the previous backup file). Difference data comprises new data (e.g., data present in the new backup file not present in the previous backup file). In the example shown, extent specifications are delivered to data storage system interface 210 and transmitted to the replica backup system. In some embodiments, difference data locations are delivered to data storage system interface 210 along with the extent specifications and transmitted to the replica backup system. In some embodiments, difference data locations are included as part of the extent specifications. In some embodiments, difference data locations are determined by comparing the sets of data segment fingerprints that represent the previous and new backup files and identifying the locations of those fingerprints that exist in the new backup file but not in the previous backup file. For example, both the previous full backup and the new full backup have already been segmented and stored on the primary backup system. For a system that is a deduplicating backup system, then the two backups will share most of their segments in common, and the two sets of segment fingerprints can be examined to determine the difference between them. Data Sender 206 provides data segment finger prints, receives data segment requests, and replies with data segments in response to requests. Meta information is provided to data storage system interface 210 enabling the reconstruction of the difference data from the data segments. In some embodiments, data segment fingerprints comprise data segment identifying information. In some embodiments, data segment fingerprints comprise information derived from the data segment. In some embodiments, data segment fingerprints comprise the output of a hash function. In the example shown, data segment fingerprints are delivered to data storage system interface 210 for transmission to the replica backup system along with the meta information to enable the reconstruction of the difference data using the data segments.

In some embodiments, the replica backup system responds to the data segment fingerprints with a set of data segment requests. In some embodiments, the replica backup system uses the data segment fingerprints to determine whether it has the corresponding data segments (e.g., the data segments used to generate the data segment fingerprints) already stored. In some embodiments, the replica backup system requests each data segment that it does not already have stored, from the set of data segments indicated by the set of data segment fingerprints. Data storage system 200 handles data segment requests from the replica backup system by delivering the data segment requests from data storage system interface 210 to data sender 206. Data sender 206 delivers the requested data segments to data storage system interface 210 for transmission to the replica system.

Figure 3:
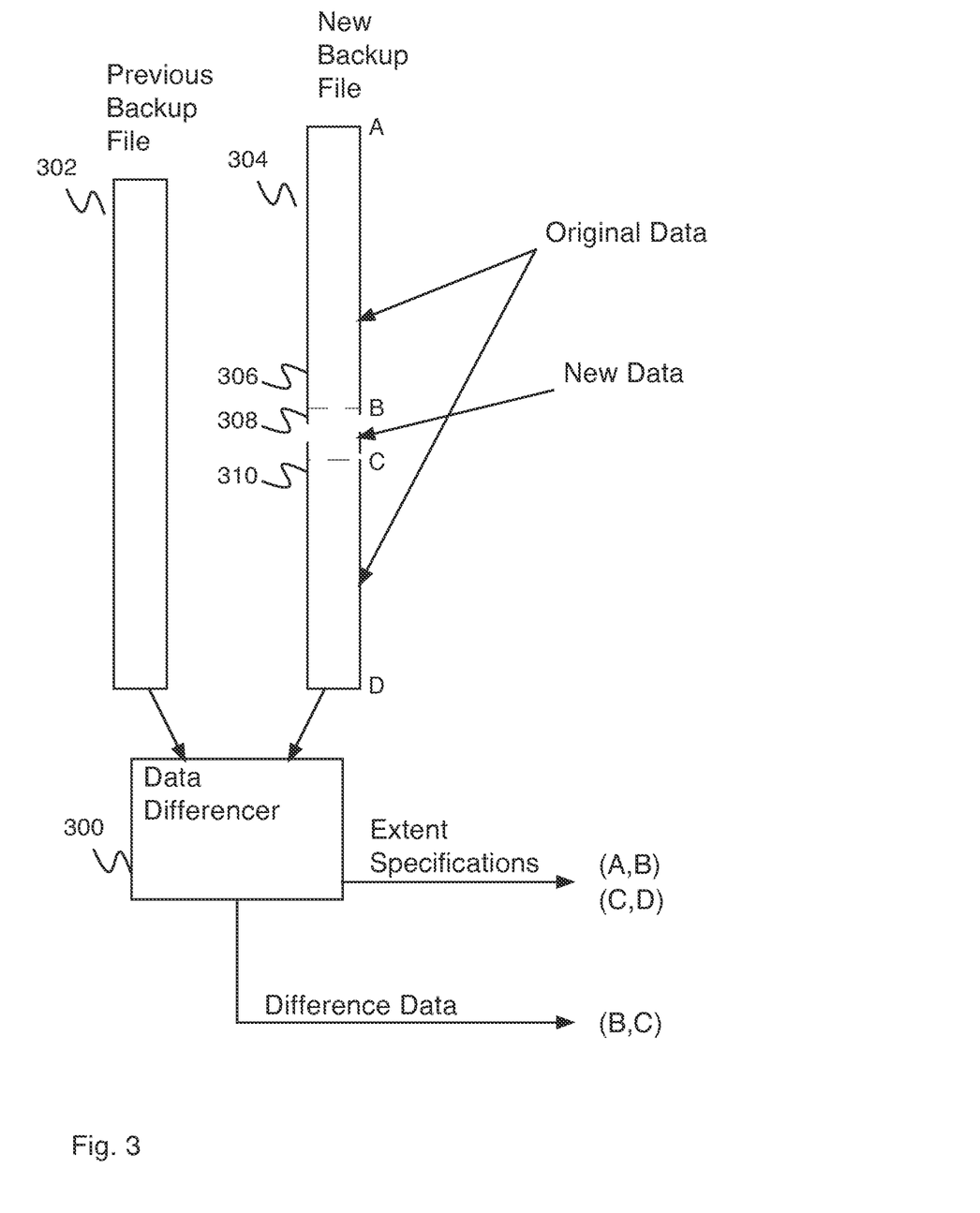
FIG. 3 is a block diagram illustrating an embodiment of data differencing.

FIG. 3 is a block diagram illustrating an embodiment of data differencing. In some embodiments, data differencing as shown in FIG. 3 comprises data differencing performed by data differencer 204 of FIG. 2. Data differencer 300 comprises a data differencer (e.g., a data differencer as in data differencer 204 of FIG. 2). In the example shown, data differencer 300 receives previous backup file 302 and new backup file 304. New backup file 304 comprises original data region 306, original data region 310, and new data region 308. Original data region 306 and original data region 310 comprise data regions that are identical in previous backup file 302 and new backup file 304. New data region 308 comprises a data region in new backup file that is not present in previous backup file 302. When data differencer 300 receives previous backup file 302 and new backup file 304, it produces extent specifications and difference data. In the example shown, extent specifications comprise descriptions of data regions unchanged from previous backup file 302 to new backup file 304 (e.g., original data region 306 and original data region 310). In some embodiments, extent specifications comprise a set of file locations. In some embodiments, extent specifications comprise the file locations within new backup file 304 comprising data regions unchanged from previous backup file 302. In some embodiments, extent specifications comprise the file locations within previous backup file 302 comprising data regions that are unchanged in new backup file 304. In some embodiments, extent specifications comprise both the file locations within new backup file 304 comprising data regions unchanged from previous backup file 302 and the file locations within previous backup file 302 comprising data regions that are unchanged in new backup file 304. In the example shown, difference data comprises data present in new backup file 304 that is not present in previous backup file 302 (e.g., new data 308). In some embodiments, extent specifications additionally comprise difference data locations (e.g., locations of data present in new backup file 304 that is not present in previous backup file 302 within new backup file 304). In some embodiments, multiple new data regions are identified in the extent specifications.

In some embodiments, a checksum is calculated and maintained across every file stored on a storage system (e.g., a deduplicating storage system, a backup system, a replica system). For example, files created with synthetic replication have a checksum stored with the file. And for another example, in normal replication, partial checksums are sent along with each segment; these checksums are added together and the final result should equal the checksum across the whole original file. In synthetic replication, checksums are sent along with each difference segment, as well as with each extent. Again, these checksums added together in order should equal the checksum across the whole original file.

Figure 4:
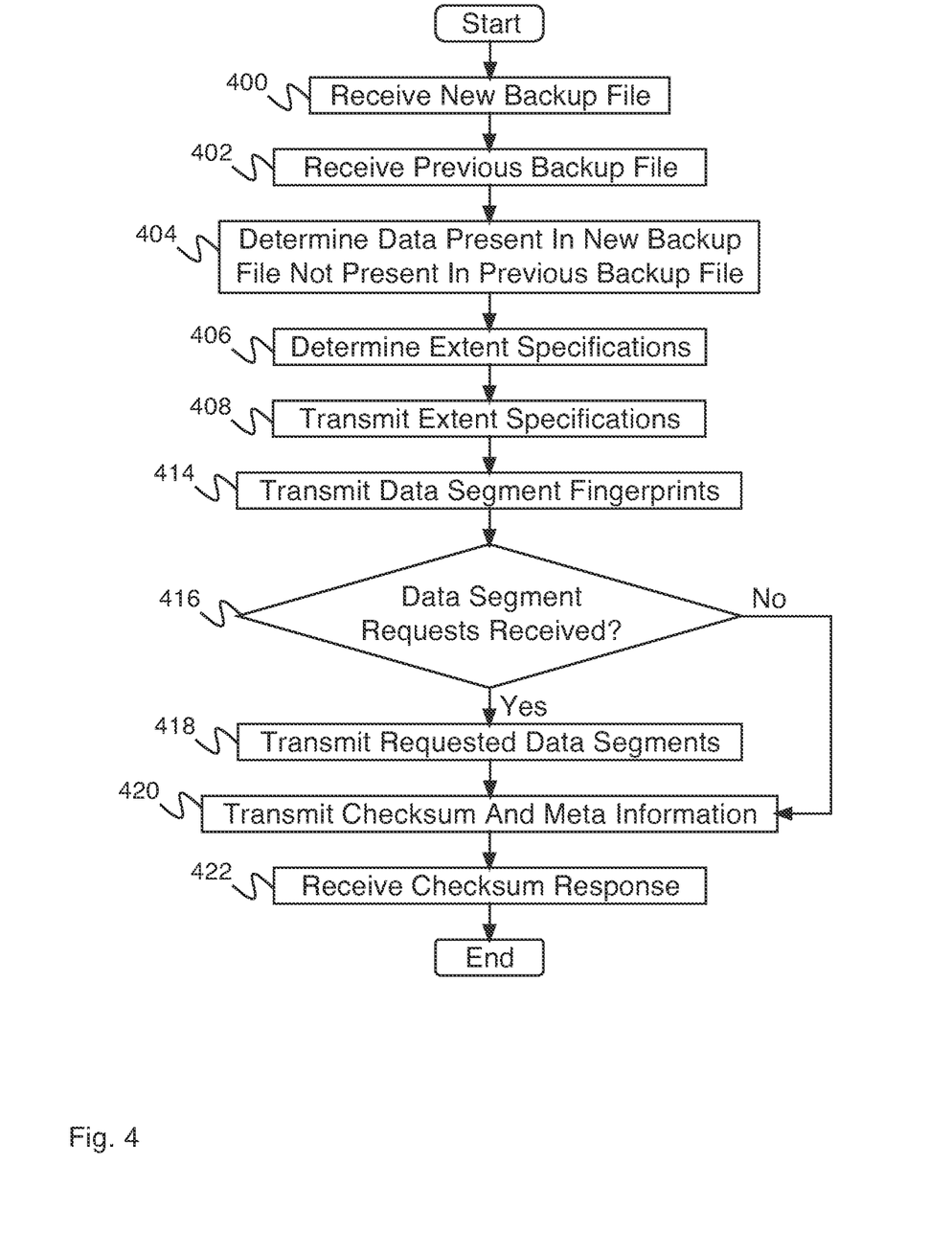
FIG. 4 is a flow diagram illustrating an embodiment of a process for efficient backup replication.

FIG. 4 is a flow diagram illustrating an embodiment of a process for efficient backup replication. In some embodiments, the process of FIG. 4 is executed by data storage system 200 of FIG. 2. In some embodiments, the process of FIG. 4 is executed by a primary backup system (e.g., primary backup system 106 of FIG. 1). In some embodiments, the process of FIG. 4 is used for efficiently replicating a backup file to a replica system (e.g., replica backup system 108 of FIG. 1). In the example shown, in 400, a new backup file is received. In some embodiments, the new backup file is received from a data storage (e.g., data storage 402 of FIG. 4). In some embodiments, the new backup file comprises a full backup. In 402 a previous backup file is received. In some embodiments, the previous backup file is received from a data storage (e.g., data storage 402 of FIG. 4). In some embodiments, the previous backup file comprises a full backup. In some embodiments, the previous backup file comprises a synthetic full backup (e.g., a full backup created from an older full backup and more recent incremental backups). In some embodiments, the previous backup file comprises the most recent previous backup file. In some embodiments, the previous backup file comprises an older previous backup file. In 404, the data present in the new backup file not present in the previous backup file (e.g., difference data) is determined. In some embodiments, the data present in the new backup file not present in the previous backup file is determined by a data differencer (e.g., data differencer 204 of FIG. 2). In some embodiments, difference data locations are additionally determined. In 406, extent specifications are determined. In some embodiments, extent specifications are determined by a data differencer (e.g., data differencer 204 of FIG. 2). In 408, extent specifications are transmitted. In some embodiments, extent specifications are transmitted by a data storage system interface (e.g., data storage system interface 210 of FIG. 2). In some embodiments, difference data locations are additionally transmitted. In some embodiments, data segment fingerprints comprise data segment identifying information. In some embodiments, data segment fingerprints comprise information derived from the data segment. In some embodiments, data segment fingerprints comprise the output of a hash function. In 414, data segment fingerprints are transmitted (e.g., by data storage system interface 210 of FIG. 2). In 416, it is determined if data segment requests have been received (e.g., by data storage system interface 210 of FIG. 2). If data segment requests were received, control passes to 418. In 418, requested data segments are transmitted (e.g., by data storage system interface 210 of FIG. 2). In some embodiments, the data segment request is delivered to the data sender (e.g., data sender 206 of FIG. 2), and the data sender returns the requested data segments (e.g., to data storage system interface 210 of FIG. 2) in response. Control then passes to 420. If it was determined in 416 that no data segment requests were received, control passes to 420. In 420, a checksum and meta information are transmitted. For example, a checksum comprises a checksum for the new backup file and meta information enables the reconstruction of the differences between the backup files to be generated. In some embodiments, a checksum comprises a function computed on the new backup file that can also be computed on the replica system for ensuring that the replication was performed correctly. In 422, a checksum response is received. In some embodiments, the replica system computes a checksum on the replicated file and compares it to the checksum transmitted in 420. In some embodiments, a checksum response comprises an indication of whether the checksum computed on the replica system matches the checksum transmitted in 402. In some embodiments, if the checksum response indicates that the files do not match, the process of FIG. 4 is repeated. In some embodiments, the data segment fingerprints and meta information are retransmitted, in the event that the checksum response indicates that the checksum failed. In some embodiments, if the checksum response indicates that the files do not match, the replicated file is marked as bad.

Figure 5:
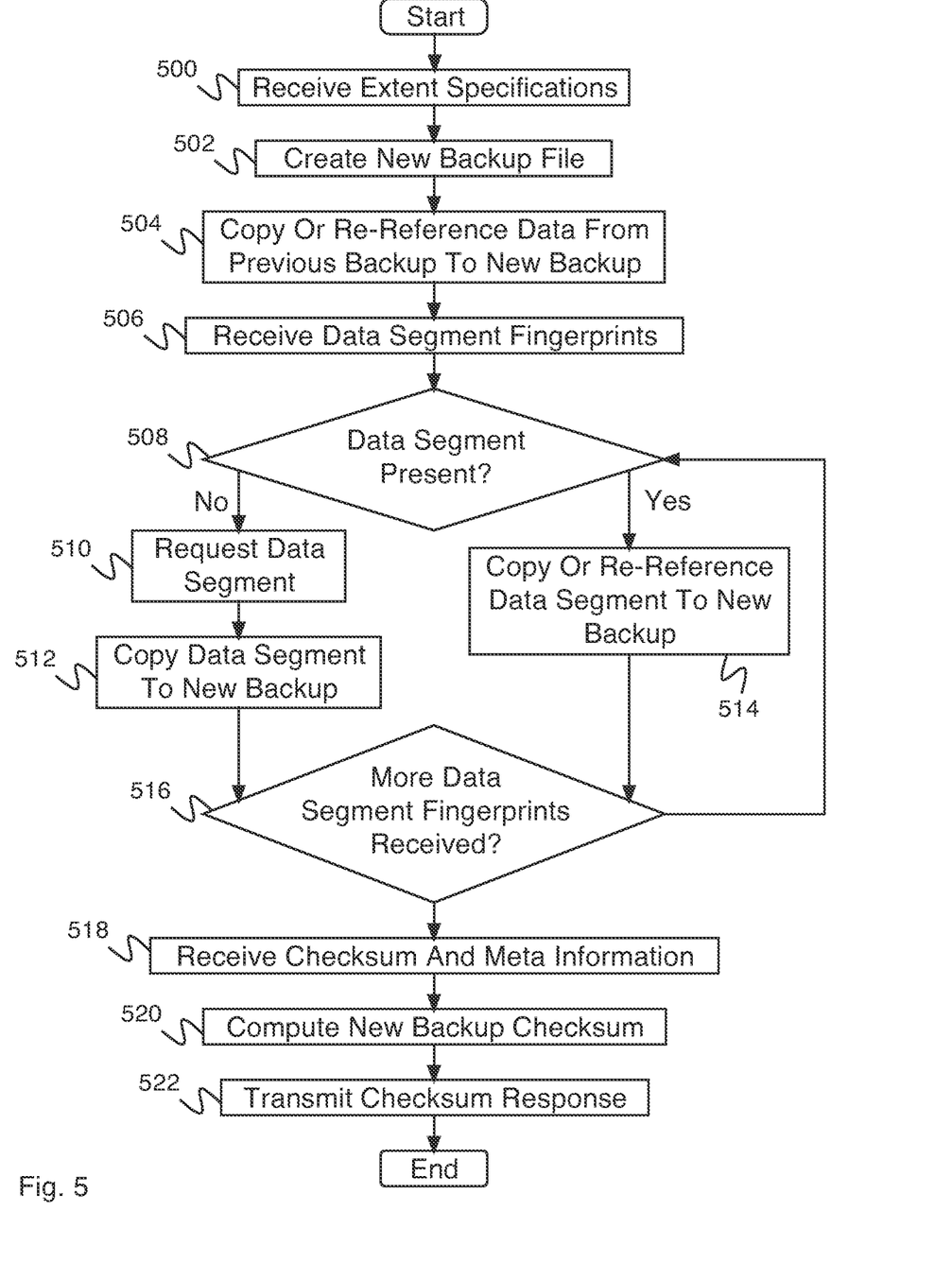
FIG. 5 is a flow diagram illustrating an embodiment of a process for creating a replica backup file.

FIG. 5 is a flow diagram illustrating an embodiment of a process for creating a replica backup file. In some embodiments, the process of FIG. 5 is executed by a replica backup system (e.g., replica backup system 108 of FIG. 1). In some embodiments, the process of FIG. 5 is executed by a replica backup system in response to a primary backup system (e.g., primary backup system 106 of FIG. 1) executing a process for efficient backup replication (e.g., the process of FIG. 4). In 500, extent specifications (e.g., extent specifications transmitted in 408 of FIG. 4) are received. In some embodiments, difference data locations are also received. In 502, a new backup file is created. In some embodiments, a new backup file comprises an empty file for copying backup data to. In 504 data is copied or re-referenced from a previous backup to the new backup. For example, in some embodiments, references to the segments (or consecutive groups of segments) in the extents, essentially fingerprints, are stored again, instead of duplicate copies of the segment data comprising the extents. In some embodiments, the extent specifications indicate the regions of data to copy from the previous backup to the new backup. In 506, data segment fingerprints (e.g., data segment fingerprints transmitted in 414 if FIG. 4) are received. In 508 it is determined whether a data segment corresponding to a received fingerprint is present (e.g., on the replica system). In some embodiments, it is determined whether a data segment corresponding to a received fingerprint is present using a fingerprint index. If it is determined that a data segment corresponding to the received fingerprint is not present, control passes to 510. In 510, the data segment is requested (e.g., a request for the data segment is transmitted to the primary backup system and the data segment is received in response). In 512, the data segment is copied to the new backup. Control then passes to 516. If it is determined in 508 that the data segment is present on the replica system, control passes to 514. In 514, the data segment is copied or re-referenced to the new backup. Control then passes to 516. In 516, it is determined whether more data segment fingerprints were received. If more data segment fingerprints were received, control passes to 508. If no more data segment fingerprints were received (e.g., segments corresponding to all data segment fingerprints have been located and copied to the new backup), control passes to 518. In 518, a checksum and meta information are received. In 520, a new backup is reconstructed using the meta information and the checksum is computed. In 522, a checksum response is computed. In some embodiments, the checksum response comprises an indication of whether the checksum received in 518 matches the checksum computed in 520. In some embodiments, if the checksum received in 518 does not match the checksum computed in 520, the new backup file is marked as bad.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for backup replication, comprising:
a data storage system comprising:
a data differencer that determines difference data between a most recent backup file and a previous backup file, wherein the difference data comprises data present in the most recent backup file not present in the previous backup file;
a data storage system interface that transmits an extent specification to a replica backup system, wherein the extent specification comprises a description of regions of unchanged data from the previous backup file to the most recent backup file, wherein the extent specification comprises file locations in the previous backup file, wherein the data storage system interface also transmits a checksum, wherein the checksum comprises a checksum for the most recent backup file; and
a data sender that:
transmits data segment fingerprints of the one or more data segments to the replica backup system using the data sender;
receives one or more data segment requests from the replica backup system using the data storage system interface, wherein a data segment request of the one or more data segment requests comprises an indication that a segment from the transmitted data fingerprints is not previously stored on the replica backup system and is requested of the data storage system; and
transmit the one or more data segments from the data storage system to the replica backup system through the data storage system interface, wherein the transmitted one or more data segments are combined with segments previously stored on the replica backup system into a replica backup file using the transmitted extent specification.

2. A system as in claim 1, wherein data segment fingerprints comprise a data segment identifying information for each of the one or more data segments.

3. A system as in claim 1, wherein data segment fingerprints are calculated for each of the one or more data segments using a hash function.

4. A system as in claim 1, wherein the data storage system interface also transmits meta information.

5. A system as in claim 1, wherein the data differencer also determines the extent specification.

6. A system as in claim 1, wherein the data storage system interface also receives a checksum response.

7. A system as in claim 6, wherein the data sender retransmits data segment fingerprints through the data storage system interface and the data storage system interface sends meta information in the event that the checksum response indicates that the checksum failed.

8. A system as in claim 7, wherein the meta information comprises information enabling the reconstruction of the most recent backup using the one or more segments on the replica backup system.

9. The system as in claim 1, wherein the replica backup file comprises re-referenced segments on the replica backup system as described in the extent specification.

10. The system as in claim 1, wherein the data differencer determines the difference data by comparing a set of data segment fingerprints that represent the most recent backup file with a set of data segment fingerprints that represent the previous backup file.

11. The system as in claim 1, wherein the most recent backup file and the previous backup file have been segmented and stored on a data storage unit of the data storage system.

12. The system as in claim 1, wherein the extent specification further includes locations of the difference data.

13. A method for backup replication comprising:
  determining difference data between a most recent backup, file and a previous backup file, using a data differencer of a data storage system, wherein the difference data comprises data present in the most recent backup file not present in the previous backup file;
  transmitting an extent specification to a replica backup system using a data storage system interface, wherein the extent specification comprises a description of regions of unchanged data from the previous backup file to the most recent backup file, wherein the extent specification comprises file locations in the previous backup file,
  transmitting a checksum using the data storage system interface, wherein the checksum comprises a checksum for the most recent backup file;
  transmitting data segment fingerprints of the one or more data segments to the replica backup system using a data sender;
  receiving one or more data segment requests at the data sender from the replica backup system using the data storage system interface, wherein a data segment request of the one or more data segment requests comprises an indication that a segment from the transmitted data fingerprints is not previously stored on the replica backup system and is requested of the data storage system; and
  transmitting the one or more data segments from the data storage system to the replica backup system using the data sender, wherein the transmitted one or more data segments are combined with segments previously stored on the replica backup system into a replica backup file using the transmitted extent specification.

14. A computer program product for backup replication, the computer program product being embedded in a non-transitory computer readable storage medium and comprising computer instructions for:
  determining difference data between a most recent backup file and a previous backup file on a data storage system, wherein the difference comprises data present in the most recent backup file not present in the previous backup file;
  transmitting an extent specification from a primary backup system to a replica backup system, wherein the extent specification comprises a description of regions of unchanged data from the previous backup file to the most recent backup file, wherein the extent specification comprises file locations in the previous backup file;
  transmitting a checksum using the data storage system interface, wherein the checksum comprises a checksum for the most recent backup file;
  transmitting data segment fingerprints of the one or more data segments to a replica backup system using a data sender;
  receiving one or more data segment requests at the data sender from the replica backup system, wherein a data segment request of the one or more data segment requests comprises an indication that a segment from the transmitted data fingerprints is not previously stored on the replica backup system and is requested of the data storage system; and
  transmitting the one or more data segments from the data storage system to the replica backup storage system, wherein the transmitted one or more data segments are combined with segments previously stored on the replica backup system into a replica backup file using the transmitted extent specification.

* * * * *